United States Patent
Brown et al.

(10) Patent No.: US 6,876,369 B2
(45) Date of Patent: Apr. 5, 2005

(54) APPLYING TRANSLUCENT FILTERS ACCORDING TO VISUAL DISABILITY NEEDS IN A NETWORK ENVIRONMENT

(75) Inventors: Michael Wayne Brown, Georgetown, TX (US); Kelvin Roderick Lawrence, Round Rock, TX (US); Michael A. Paolini, Austin, TX (US); Richard Scott Schwerdtfeger, Round Rock, TX (US)

(73) Assignee: International Business Machines Corp., Armonk, NY (US)

( * ) Notice: Subject to any disclaimer, the term of this patent is extended or adjusted under 35 U.S.C. 154(b) by 601 days.

(21) Appl. No.: 10/054,446

(22) Filed: Jan. 22, 2002

(65) Prior Publication Data

US 2003/0137547 A1 Jul. 24, 2003

(51) Int. Cl.⁷ ................................................. G09G 5/00
(52) U.S. Cl. ...................... 345/768; 345/865; 345/781; 345/765
(58) Field of Search ................................ 345/744–747, 345/760, 764, 765, 768, 781, 865

(56) References Cited

U.S. PATENT DOCUMENTS

| | | | |
|---|---|---|---|
| 5,003,491 A | | 3/1991 | Heckt |
| 5,150,457 A | | 9/1992 | Behm et al. |
| 5,267,331 A | * | 11/1993 | Siwoff .......................... 382/274 |
| 5,367,632 A | | 11/1994 | Bowen et al. |
| 5,388,207 A | | 2/1995 | Chia et al. |
| 5,604,514 A | | 2/1997 | Hancock |
| 5,627,960 A | | 5/1997 | Clifford et al. |
| 5,651,107 A | | 7/1997 | Frank et al. |
| 5,678,015 A | | 10/1997 | Goh |
| 5,764,229 A | | 6/1998 | Bennett |
| 5,805,163 A | * | 9/1998 | Bagnas ........................ 345/768 |
| 5,831,615 A | * | 11/1998 | Drews et al. ................ 345/768 |
| 5,896,131 A | | 4/1999 | Alexander |
| 5,914,725 A | | 6/1999 | MacInnis et al. |
| 5,933,141 A | * | 8/1999 | Smith ........................... 725/39 |
| 5,949,432 A | | 9/1999 | Gough et al. |
| 6,065,057 A | | 5/2000 | Rosen et al. |
| 6,072,483 A | | 6/2000 | Rosin et al. |
| 6,118,427 A | | 9/2000 | Buxton et al. |
| 6,189,064 B1 | | 2/2001 | MacInnis et al. |
| 6,429,883 B1 | * | 8/2002 | Plow et al. .................. 345/768 |
| 6,538,660 B1 | * | 3/2003 | Celi et al. .................... 345/592 |
| 6,633,310 B1 | * | 10/2003 | Andrew et al. ............. 345/728 |
| 6,654,025 B1 | * | 11/2003 | Kaczowka .................... 345/592 |
| 6,661,426 B1 | * | 12/2003 | Jetha et al. .................. 345/629 |
| 6,670,970 B1 | * | 12/2003 | Bonura et al. .............. 345/768 |
| 6,720,982 B1 | * | 4/2004 | Sakaguchi .................. 345/768 |
| 6,738,081 B2 | * | 5/2004 | Gupta et al. ................. 345/767 |

OTHER PUBLICATIONS

IBM Technical Disclosure Bulletin "Translucent Window Attribute" vol. 36, No. 06A, Jun. 1993 pp. 135–136.
IBM Technical Disclosure Bulletin "Overlay Mechanism for Annotating Sharing and Remote Window Control" vol. 36, No. 06A, Jun. 1993 pp. 407–409.

(Continued)

*Primary Examiner*—John Cabeca
*Assistant Examiner*—Brian Detwiler
(74) *Attorney, Agent, or Firm*—Marilyn Smith Dawkins

(57) ABSTRACT

A method, system and program for selectively applying translucent filters to graphical images according to visual disability needs are provided. An image is received at a receiver communicatively connected via a network to an image server and connected to a display device for output of the image. A translucent style is specified for a particular user at the receiver. A translucent filter overlay is applied over the image according to the translucent style for output to the display device, such that the image output to the display device is adjusted to specifically accommodate for a visual disability of the particular user.

15 Claims, 4 Drawing Sheets

OTHER PUBLICATIONS

IBM Technical Disclosure Bulletin "Translucent Windows: Dragging an Image without Obscuring the Desktop:", vol. 37, No. 10, Oct. 1994 p. 15.

IBM Research Disclosure 426114 "Multi–modal Data Access" Oct. 1999 pp. 1393–1396.

IBM Docket AUS920010535US1 Applying Translucent Filters According To Visual Disability Needs.

AE Make the Language Bar Transparent, 1 page, wysiwyg://fraContent.fraRightFrame.50/ht...olbar–change transparency.asp?frame=true; 2001.

AF TUCOWS Shell Enhancements Trans–XP, 2 pages, Wysiwyg://20//http//ww.tucows.com/system/preview/232626.html, Jan. 29, 2002.

AG The Inconfactory: Your Quality Freeware Icons Hub (ibxp–home.asp) 2 pages, Http://www.iconfactory.com/ibxp–home.asp; 2001.

AF Tweak XP, 2 pages, http://www.totalidea.de/transxp.htm; Nov. 10, 2001.

AI Trans–XP Information, Details, and Download from VoodooFiles.com, 1 page, wysiwyg://15/http://www.voodoofiles.com/5817; Mar. 25, 2002.

AJ Cronosoft, 1 page, wysiwyg://26//http://www.cronosoft.com/download/qhwxp/index.htm; 2001.

AK Windows XP Home Page, 1 page, Wysiwyg://33.http://www.microsoft.com/windowssxp/default.asp; Mar. 18, 2002.

* cited by examiner

| TRANSLUCENT STYLE DATABASE | | 70 |
|---|---|---|
| USER | TYPE OF GRAPHIC IMAGE | STYLE |
| A | TEXT | ROSE |
| C | VIDEO | RED/GREEN OVERLAY #1 |
| COLOR BLIND | ALL | RED/GREEN OVERLAY #2 |
FIGURE 4
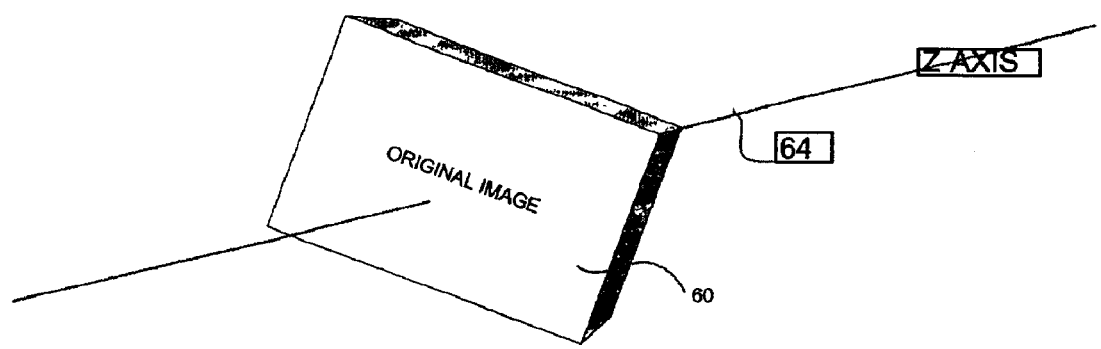
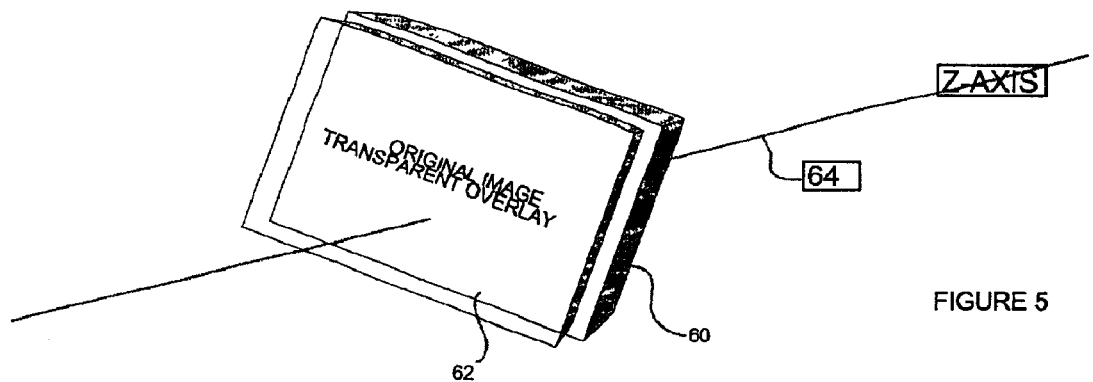
FIGURE 5

APPLYING TRANSLUCENT FILTERS ACCORDING TO VISUAL DISABILITY NEEDS IN A NETWORK ENVIRONMENT

CROSS-REFERENCE TO RELATED APPLICATIONS

The present application is related to the following copending application, which is filed on even date herewith and incorporated herein by reference:

(1) U.S. patent application Ser. No. 10/054,445.

BACKGROUND OF THE INVENTION

1. Technical Field

The present invention relates in general to computer systems with graphical user interfaces and, in particular, to applying tinted transparent filters to graphical images. Still more particularly, the present invention relates to applying an adjustable transparent filter to a graphical user interface according to visual disability needs.

2. Description of the Related Art

Computer technology is continuously expanding, resulting in modern computer systems which provide increased performance. In particular, as computer technology expands, technologies that aid those with visual disabilities also continue to expand. Common visual disabilities include, but are not limited to, color blindness and dyslexia. One example of an aid for those with visual disabilities is a color transparency that increases visibility when physically laid over a display monitor.

A limitation of current physical color filters is that the color and opacity of the physical color filter cannot be varied to meet individual visibility needs. In particular, the brightness of images on a display monitor may vary depending on a computer application executing a video or other graphic being displayed, or even the type of display monitor used. Such variation limits the benefit of a physical color filter that does not adjust to the variations. In addition, different hues of color filters are needed for different visual disabilities, such that a different color filter is needed to be physically laid over a display monitor for each type of visual disability. For example, a red and green color filter may benefit one with color blindness while a rose hued color filter may benefit one with dyslexia.

Another limitation of current physical color filters is that not every display monitor utilized by an individual with a visual disability will include a physical color filter. For example, an individual may look at a television, a computer screen, an automatic teller machine display (ATM) and other display monitors during the day. Attaching a color filter to each of these multiple types of display monitors of multiple sizes is cumbersome to individuals.

Color filters provide a color hue that is translucent, such that the displayed image is visible through the color filter. Displaying windows with translucency in a graphical user interface is described in U.S. Pat. No. 5,892,511 where multiple windows are open and the top-level windows are displayed as translucent such that the user may view windows positioned below. However, merely displaying top-level windows as translucent does not aid a user with visual disabilities in viewing all information displayed on a monitor.

Therefore, in view of the foregoing, there is a need for a method, system and program for allowing users to selectively apply a color transparent window where the user may adjust the opacity and hue of the color transparent window applied over a display image in order to achieve optimum visibility for that user.

SUMMARY OF THE INVENTION

In view of the foregoing, it is therefore an object of the present invention to provide an improved method, system and program for an improved graphical user interface.

It is another object of the present invention to provide a method, system and program for applying tinted transparent filters to graphical images.

It is yet another object of the present invention to provide a method, system and program for applying an adjustable transparent filter to a graphical user interface according to visual disability needs.

According to one aspect of the present invention, an image is received at a receiver communicatively connected via a network to an image server and connected to a display device for output of the image. A translucent style is specified for a particular user at the receiver. A translucent filter overlay is applied over the image according to the translucent style for output to the display device, such that the image output to the display device is adjusted to specifically accommodate for a visual disability of the particular user. The translucent filter overlay may be applied to the total image area for the display device or to selected areas, depending on the type of data displayed within those selected areas.

The translucent style may be received as input from a remote server system communicatively connected to the receiver via the network. In addition, the translucent style may be received as input from a personal storage device detectable by the receiver. Further, the translucent style may be received as input selected according to a type of visual disability and may be specified for a particular user by a visual specialist.

According to another advantage of the present invention, the translucent style may be specified in a cascading style sheet (CSS) or may be converted into a CSS for determining the translucent filter overlay. In addition, the actual style of the image may be adjusted by the CSS.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a table of entries within a transparency style database in accordance with the method, system, and program of the present invention;

FIG. 5 depicts an illustrative example of a transparent overlay in accordance with the method, system, and program of the present invention.

DETAILED DESCRIPTION OF THE PREFERRED EMBODIMENT

A method, system, and program for applying translucent filters according to visual disability needs is provided. A translucent filter is a window displayed to be visible yet also show any windows on top of it and behind it. Advantageously, in the present invention, translucent filters may extend to the edges of a display monitor such that the application of the filter is not detectable. In addition, translucent filters may be selectively applied to portions of a display monitor, such as where any text is displayed.

This translucent effect may be further enhanced in any of a wide variety of conventional manners, such as by changing the color of the translucent filter, changing the intensity of the color of the translucent filter, and other adjustments to the opacity and hue of the translucent filter. In particular, a user may have a translucency profile that is detected by multiple diverse display monitors viewed by the user, where the translucency profile may be utilized to specify the color, opacity, and size of the translucent filter applied to multiple diverse display monitors.

Additionally, it is to be appreciated that although translucent filters are discussed herein, the present invention may use any other method which serves to visibly filter graphical displays to accommodate visual disabilities. For example, a user may select for any text to be output in a font size of at least 20 point type, to accommodate for a visual disability.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
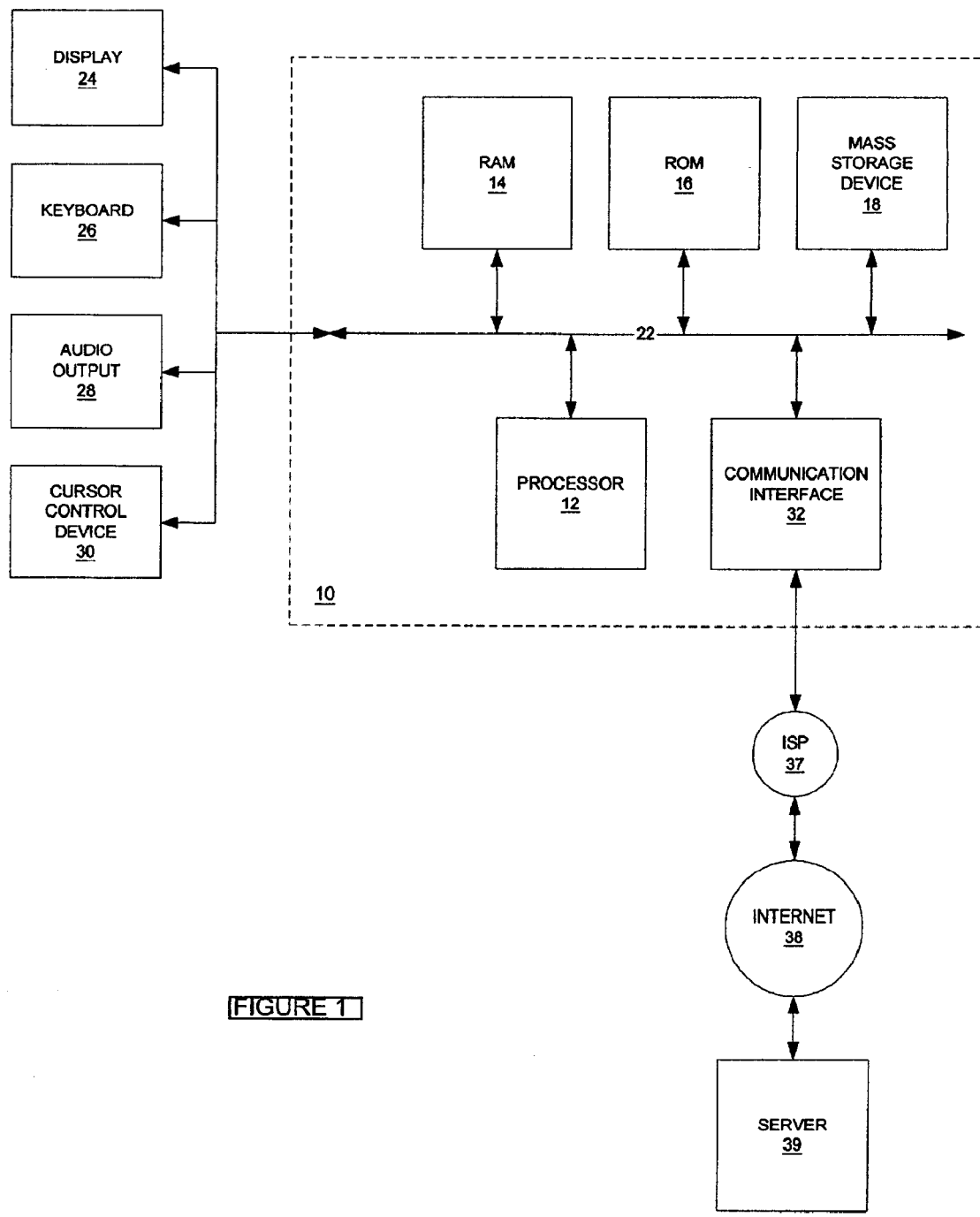
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application 10 software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowchart of FIG. 6 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communication interface 32, which carry the digital or analog data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Network Context

Figure 2:
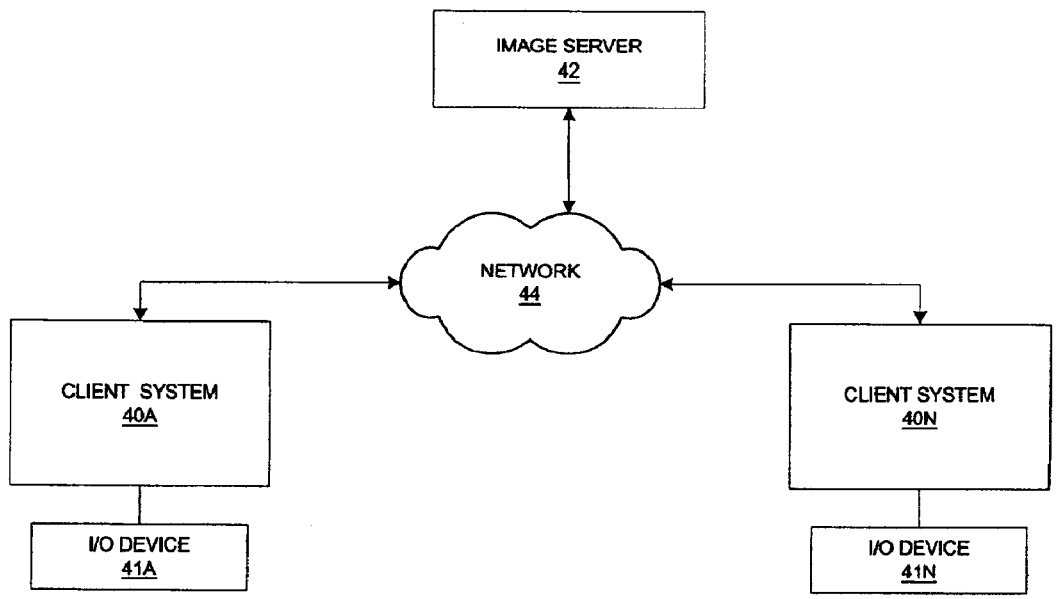
FIG. 2 illustrates a simplified block diagram of a client/server environment in which the transfer of images typically takes place in accordance with the method, system and program of the present invention.

With reference now to FIG. 2, there is depicted a simplified block diagram of a client/server environment in which the transfer of images typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client systems 40a–40n and render Web documents (pages) served by at least one server such as image server 42. Additionally, each of client systems 40a–40n and image server 42 may function as both a "client" and a "server" and may be implemented utilizing a computer system such as computer system 10 of FIG. 1.

The Web may refer to the total set of interlinked hypertext documents residing on servers all around the world. A network 44, such as the Internet, provides an infrastructure for transmitting these hypertext documents between client systems 40a–40n and image server 42. Documents (pages) on the Web may be written in multiple languages, such as Hypertext Markup Language (HTML) or Extensible Markup Language (XML), and identified by Uniform Resource Indicators (URIs) that specify the particular image server 42 and pathname by which a file can be accessed, and then transmitted from image server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, image server 42 transfers a stream of data that is displayable as images, video, text, and other data to client systems 40a–40n. In addition to transmitting web pages, in particular, image server 42 may function as a digital television (DTV) transmitter, a satellite television transmitter, or other types of broadcasting transmitters. Further, image server 42 may function as a data transmitter for information to be displayed at an automatic teller machine (ATM), a display for travel information (e.g. bus terminal schedules), and other display areas that are generally available to the public.

According to one advantage of the present invention, multiple client systems 40a–40n may receive a particular stream of data for an image, however the output of the image may be specified at each of client systems 40a–40n to accommodate for multiple types of disabilities. Alternatively, each of client systems 40a–40n may receive an image that is specified according to viewer by image server 42.

Streams of data received at each of client systems 40a–40n are converted into an output format for display at input/output (I/O) devices 41a–41n. I/O devices 41a–41n may include multiple types of output interfaces including, but not limited to, display monitors, high definition enabled televisions, audio outputs, portable display devices, and other output interfaces that may be limited to output, however advantageously allow for both input and output.

Figure 3:
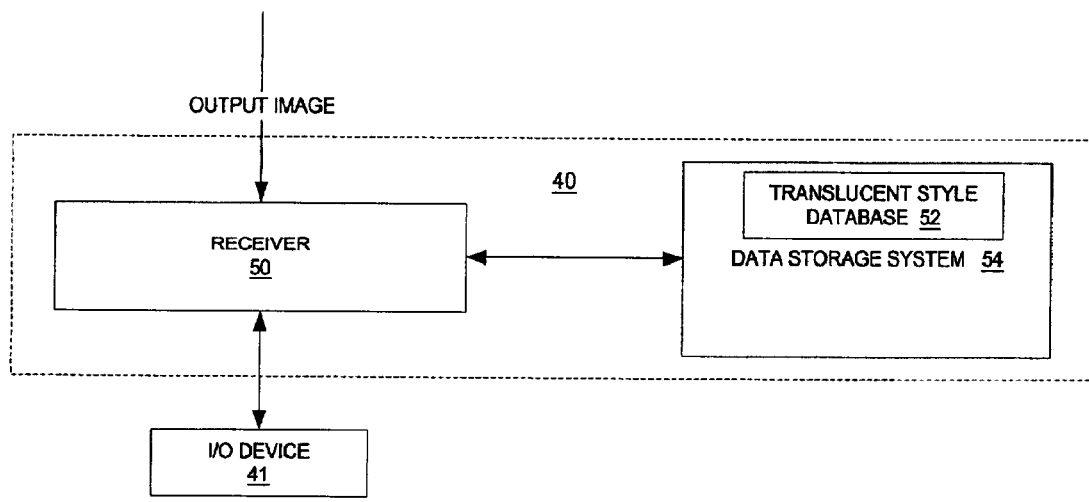
FIG. 3 depicts a block diagram of a client system in accordance with the method, system, and program of the present invention.

Referring now to FIG. 3, there is illustrated a block diagram of a client system in accordance with the method, system, and program of the present invention. In the embodiment, client system 40 includes a receiver 50 for receiving a stream of data including information for an output image.

Advantageously, receiver 50 converts the output image into a format for display via I/O device 41. Receiver 50 may also apply a transparent overlay image to the original output image prior to output to I/O device 41. In particular, receiver 50 may utilize an operating system or browser software for applying the transparent overlay image to the original output image. In addition, in particular, an SVG output format may be utilized for implementing the display of images with transparent overlays via I/O device 41.

In particular, client system 40 may access a data storage system 52 including a translucent style database 54 that indicates preferred color filters to be applied to graphical outputs. In particular, color filters may be applied in order to aid viewers with visual disabilities.

The style preferences within translucent style database 54 may be stored in multiple data formats. Preferably, a user may define a style preference including hue, tint, and transparency. In addition, a user may select from multiple pre-defined styles that are generically defined for multiple types of visual disabilities.

One data format that is particularly advantageous for storage of style preferences in the present invention is a cascading style sheet (CSS). Cascading style sheets are typically utilized to control the appearance of web-based documents. For example, "H1 {color: gray; background: white;}" defines a heading to be colored gray with a white background.

An advantage of cascading style sheets is that the appearance of a heading "H1" can be defined once, but apply across multiple pages. In addition, a rule for an alternate heading "H1" may be defined for a single page, where the alternate heading "H1" will override the general heading "H1".

The appearance of pages may be defined by the author of the pages according to CSSs. In addition, viewers may create reader CSSs that will cascade with the author styles as well as the styles utilized by the browser or other application interfacing the web pages. For example, a color-blind reader could create a style for headings "H1 {color: white; background: black;}" to make headings stand out.

According to one advantage of the present invention, a user may define the tint, hue, and level of transparency of a overlay to be applied to particular types of images, where the style is translated into a reader CSS. According to another embodiment of the present invention, the CSS received with the output image may include multiple pre-defined styles, where the reader CSS indicates which of those pre-defined styles to be applied according to visual disability.

In particular, client system 40 may store multiple sets of translucent styles, such that each viewer may select from a set of translucent styles stored for that viewer. In addition, client system 40 may receive translucent style preferences for storage within translucent style database 54 from inputs including, but not limited to, a keyed entry, a voiced entry, a personal storage device (e.g. a smartcard), a remote server system, and other inputs. According to one advantage of the present invention, a remote server system may store translucent style preferences for multiple users, where a user may request the translucent style preference to be transferred to a current receiver by entering a personal identification or other indicator.

With reference now to FIG. 4, there is depicted a table of entries within a transparency style database in accordance with the method, system, and program of the present invention. As illustrated, a table 70 includes translucent style preferences for multiple users.

In the example, users may be specified according to individual users, such as individual users "A" and "C". In addition, in the example, users may be specified according to a particular type of visual disability, such as "color blind" users.

In addition, in the example, the type of graphic output is specified. Multiple types of graphic output are distinguishable in a single output stream. For example, a web page may include video output and text output, where each of the types of graphics are distinguished.

Further, the style to be applied to a transparent overlay is specified for each user. The style may be indicated by a particular color label that represents a pre-determined output of hue and tint, such as rose or red/green overlay #1. Alternatively, a style may be specialized to a particular style and tint. Further, a level of transparency may be defined.

According to one advantage of the present invention, a visual specialist may specify a style to be applied to a transparent overlay in order to enhance visual correction for a particular viewer. Such a style may be further specified according to the hue and tint of the different types of graphical output.

Referring now to FIG. 5, there is illustrated an illustrative example of a transparent overlay in accordance with the method, system, and program of the present invention. As illustrated, an original image 60 is depicted along a z-axis 64 within a display area. Original image 60 may include graphics, video, text, and other displayable objects.

According to one advantage of the present invention, a transparent overlay 62 is applied to original image 60 along z-axis 64, wherein original image 60 is visible through transparent overlay 62. In particular, transparent overlay 62 may overlap all of original image 60 or may only overlap portions of original image 60. In addition, in particular, transparent overlay 62 may be defined by a particular tint, hue and level of transparency.

Figure 6:
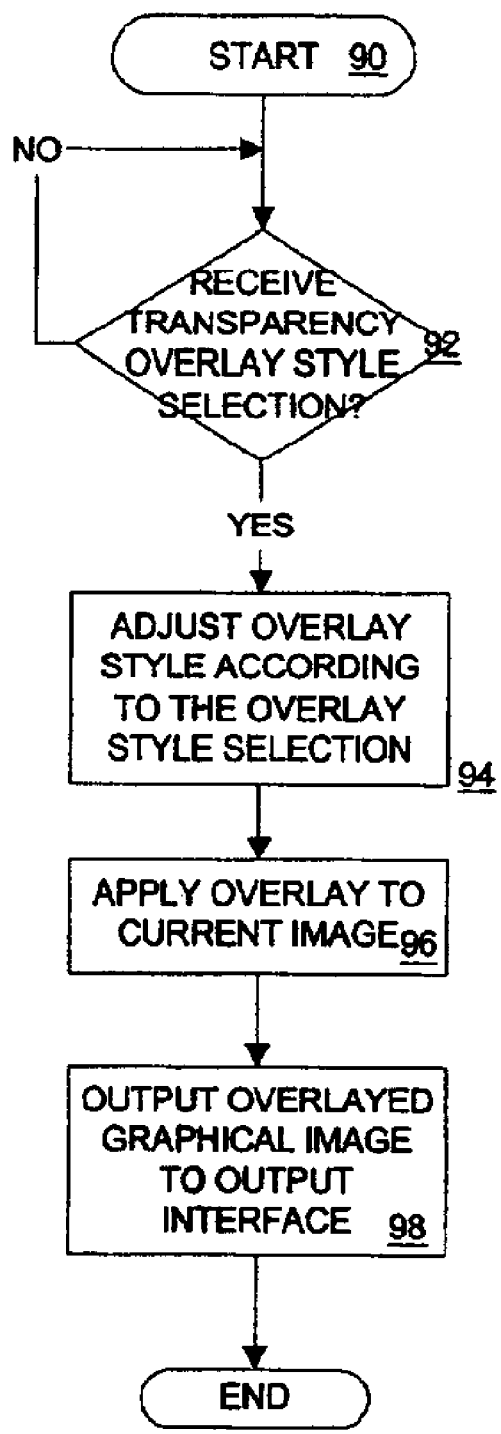
FIG. 6 illustrates a high level logic flowchart of a process and program for applying a transparent overlay in accordance with the method, system, and program of the present invention.

With reference now to FIG. 6, there is depicted a high level logic flowchart of a process and program for applying a transparent overlay in accordance with the method, system, and program of the present invention. As illustrated, the process starts at block 90 and thereafter passes to block 92.

Block 92 depicts a determination as to whether or not a transparency overlay style selection is received. If a transparency overlay style selection is not received, then the process iterates at block 92. If a transparency overlay style selection is received, then the process passes to block 94.

Block 94 illustrates adjusting an overlay style according to the overlay style selection received. In particular, the overlay style may include a CSS or other type of style file for controlling the appearance of a transparency overlay output. Next, block 96 depicts applying the transparency overlay over the portions of the current output image affected by the transparency overlay style selection. Thereafter, block 98 illustrates outputting the overlayed graphical image to an output interface, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for adjusting graphical displays to accommodate for a visual disability, said method comprising the steps of:
    receiving an image at a receiver communicatively connected via a network to an image server and connected to a display device for output of said image;
    receiving a translucent style specified for a particular user at said receiver according to a type of visual disability;
    applying a translucent filter overlay over said image according to said translucent style for output to said display device, such that said output to said display device is adjusted to specifically accommodate for a visual disability of said particular user; and
    wherein the step of receiving a translucent style specified for a particular user further comprises receiving said translucent style as input from one of a remote server system communicatively connected to said receiver via said network or a personal storage device detectable by said receiver.

2. The method for adjusting graphical displays to accommodate for a visual disability according to claim 1, said method further comprising the step of:
    specifying a style sheet utilized for controlling application of said translucent filter from said translucent style specified for said particular user.

3. The method for adjusting graphical displays to accommodate for a visual disability according to claim 1, said method further comprising the step of:
    applying said translucent filter to a total image area for said display device.

4. The method for adjusting graphical displays to accommodate for a visual disability according to claim 1, said method further comprising the step of:
    means for receiving said translucent style as input from a remote server system communicatively connected to said receiver via said network.

5. The method for adjusting graphical displays to accommodate for a visual disability according to claim 1, said step of receiving a translucent style specified for a particular user at said receiver, further comprising the step of:
    receiving said translucent style specified for said particular user by a visual specialist.

6. A system for adjusting graphical displays to accommodate for a visual disability, said system comprising:
- a receiver communicatively connected via a network to an image server for receiving an image and connected to a display device for output of said image;
- means for receiving a translucent style specified for a particular user at said receiver according to a type of visual disability;
- means for applying a translucent filter overlay over said image according to said translucent style for output to said display device, such that said output to said display device is adjusted to specifically accommodate for a visual disability of said particular user; and
- wherein the means for receiving a translucent style specified for a particular user further comprises means for receiving said translucent style as input from one of a remote server system communicatively connected to said receiver via said network or a personal storage device detectable by said receiver.

7. The system for adjusting graphical displays to accommodate for a visual disability according to claim 6, said system further comprising:
- means for specifying a style sheet utilized for controlling application of said translucent filter from said translucent style specified for said particular user.

8. The system for adjusting graphical displays to accommodate for a visual disability according to claim 6, said system further comprising:
- applying said translucent filter to a portion of said total image area, wherein said portion of said total image area is specified by said translucent style.

9. The system for adjusting graphical displays to accommodate for a visual disability according to claim 6, said system further comprising:
- means for applying said translucent filter to a portion of said total image area, wherein said portion of said total image area is specified by said translucent style.

10. The system for adjusting graphical displays to accommodate for a visual disability according to claim 6, said means for receiving a translucent style specified for a particular user at said receiver, further comprising:
- means for receiving said translucent style specified for said particular user by a visual specialist.

11. A program for adjusting graphical displays to accommodate for a visual disability, residing on a computer usable medium having computer readable program code means, said program comprising:
- means for enabling receipt of an image at a receiver communicatively connected via a network to an image server for receiving an image and connected to a display device for output of said image;
- means for enabling receipt of a translucent style specified for a particular user at said receiver according to a type of visual disability;
- means for controlling application of a translucent filter overlay over said image according to said translucent style for output to said display device, such that said output to said display device is adjusted to specifically accommodate for a visual disability of said particular user; and
- wherein the means for enabling receipt of said translucent style specified for a particular user further comprises means for receiving said translucent style as input from one of a remote server system communicatively connected to said receiver via said network or a personal storage device detectable by said receiver.

12. The program for adjusting graphical displays to accommodate for a visual disability according to claim 11, said program further comprising:
- means for enabling specification of a style sheet utilized for controlling application of said translucent filter from said translucent style specified for said particular user.

13. The program for adjusting graphical displays to accommodate for a visual disability according to claim 11, said program further comprising:
- means for controlling application of said translucent filter to a total image area for said display device.

14. The program for adjusting graphical displays to accommodate for a visual disability according to claim 11, said program further comprising:
- means for controlling application of said translucent filter to a portion of said total image area, wherein said portion of said total image area is specified by said translucent style.

15. The program for adjusting graphical displays to accommodate for a visual disability according to claim 11, said program further comprising:
- means for enabling receipt of said translucent style specified for said particular user by a visual specialist.

* * * * *

UNITED STATES PATENT AND TRADEMARK OFFICE
CERTIFICATE OF CORRECTION

PATENT NO. : 6,876,369 B2
APPLICATION NO. : 10/054446
DATED : April 5, 2005
INVENTOR(S) : Michael W. Brown et al.

Page 1 of 1

It is certified that error appears in the above-identified patent and that said Letters Patent is hereby corrected as shown below:

Claim 4
Column 8, line 59, please delete "means for receiving said translucent style as input from a remote server system communicatively connected to said receiver via said network." and replace it with --applying said translucent filter to a portion of said total image area, wherein said portion of said total image area is specified by said translucent style.--.

Claim 8
Column 9, line 30, please delete "applying said translucent filter to a portion of said total image area, wherein said portion of said total image area is specified by said translucent style." and replace it with --means for applying said translucent filter to a total image area for said display device.--.

Signed and Sealed this

Twenty-eighth Day of August, 2007

JON W. DUDAS
*Director of the United States Patent and Trademark Office*